(12) United States Patent
Laimboeck

(10) Patent No.: US 8,627,790 B2
(45) Date of Patent: Jan. 14, 2014

(54) W6-MOTOR

(71) Applicant: MAHLE KOENIG Kommanditgesellschaft GmbH & Co KG, Rankwell (AT)

(72) Inventor: Franz J. Laimboeck, Goleta, CA (US)

(73) Assignee: Mahle Koenig Kommanditgesellschaft GmbH & Co. KG, Rankweil (AT)

( * ) Notice: Subject to any disclaimer, the term of this patent is extended or adjusted under 35 U.S.C. 154(b) by 0 days.

(21) Appl. No.: 13/621,324

(22) Filed: Sep. 17, 2012

(65) Prior Publication Data
US 2013/0220246 A1 Aug. 29, 2013

Related U.S. Application Data

(60) Provisional application No. 61/535,674, filed on Sep. 16, 2011.

(51) Int. Cl.
*F02B 75/22* (2006.01)
(52) U.S. Cl.
USPC ............ 123/54.1; 123/54.2; 123/52.1

(58) Field of Classification Search
USPC ............ 123/52.1, 54.1, 54.2, 54.6, 193.6
See application file for complete search history.

(56) References Cited

U.S. PATENT DOCUMENTS

| | | | | |
|---|---|---|---|---|
| 1,740,843 A * | 12/1929 | Stickney | ........ | 123/41.74 |
| 5,765,451 A * | 6/1998 | Carone | ........ | 74/597 |
| 6,058,901 A * | 5/2000 | Lee | ........ | 123/197.1 |
| 6,257,178 B1 * | 7/2001 | Laimbock | ........ | 123/54.1 |

* cited by examiner

*Primary Examiner* — Hung Q Nguyen
(74) *Attorney, Agent, or Firm* — Laurence A. Greenberg; Werner H. Stemer; Ralph E. Locher

(57) ABSTRACT

A W6 engine has two W3 engine units disposed juxtaposed on a common crankshaft. Exhaust pipes of the cylinders containing the pistons driving the common crankshaft are guided to an exhaust. Each cylinder has at least one intake valve and at least one exhaust valve. The intake valves for the individual cylinders are disposed in wall portions of the respective cylinders oriented in the same circumferential direction about the crankshaft or lateral portions of their cylinder head. The exhaust valves for the individual cylinders are disposed in opposite circumferential direction. Each exhaust valve closes an exhaust pipe, which is led from the valve seat of the exhaust valve to the outer surface of the W3 engine unit in which the cylinder with the exhaust valve is disposed.

20 Claims, 9 Drawing Sheets

W6-MOTOR

BACKGROUND OF THE INVENTION

Field of the Invention

The invention relates to a W6 engine with two W3 engine units disposed juxtaposed on a common crankshaft, wherein in both W3 engine units the axes of juxtaposed cylinders enclose the same bank angle of 30 to 70°, preferably of 38° to 60°, and the exhaust pipes of the cylinders containing the pistons driving the common crankshaft are led to an exhaust, wherein each cylinder comprises at least two intake valves and at least one exhaust valve.

BRIEF SUMMARY OF THE INVENTION

This object is achieved for a W6 engine of the above-mentioned type according to the invention as claimed. A W6 engine is thus characterized according to the invention in that This object is achieved for a W6 engine of the above-mentioned type according to the invention with the features laid out in the characteristics of claim 1. A W6 engine is thus characterized according to the invention in that the intake valves for the individual cylinders of the two W3 engine units are disposed in wall portions of the respective cylinders oriented in the same circumferential direction about the crankshaft or lateral portions of its cylinder head, that the exhaust valves for the individual cylinders of the two W3 engine units are disposed in wall portions oriented in the same but opposite circumferential direction to the circumferential direction of the wall elements in which the intake valves are disposed about the crankshaft of the respective cylinder or lateral portions of its cylinder head, that the predetermined number of side-valve exhaust valves and side-valve intake valves are disposed in or on mutually opposing wall portions of the V-shaped space bounded by cylinders arranged juxtaposed in the respective W3 engine unit, and that each exhaust valve closes an exhaust pipe, which is led from the valve seat of said exhaust valve to the lateral surface or outer surface, preferably extending perpendicularly to the crankshaft, of that W3 engine unit in which the cylinder with said exhaust valve is disposed and which faces away from the respective other W3 engine unit.

The special arrangement of the intake and exhaust valves enables a simple design and efficient operation of such an engine to be achieved. Said operation supports the exact and efficient emptying of the individual cylinders through the exhaust pipe duct. The exhaust pipes are led out of the two W3 engine units laterally, enabling structural and operational, especially cooling-related, advantages and also a visually pleasing exterior of the engine to be achieved when installed in a motor cycle. Moreover, a compact, space-saving design is the result.

From the respective exhaust valve, the exhaust pipe is led over a short path to the outer sidewall faces of the respective W3 engine unit and can, as soon as it is led out of the engine block of the W6 engine or the respective W3 engine unit, be shaped or led in any manner for connection to the exhaust. A common exhaust or a dedicated exhaust for each exhaust pipe can be provided.

A simple design of the exhaust pipe results if the exhaust pipe comprises a pipe section outgoing from the valve seat, having a directional component, which points towards the crankshaft and/or transitions into a bend, to which is connected a pipe section directed towards the lateral surface of the respective W3 engine unit and/or the pipe section in proximity to the lateral surface, especially outside the W3 engine unit or outside the outer surface, having an exhaust manifold connected to a pipe leading to the exhaust. This allows different structural conditions to be taken into account.

A W6 engine according to the invention is constructed in a simple manner if the axes of the cylinders of the two W3 engine units lie in or parallel to a plane, which extends perpendicularly relative to the axis of the crankshaft and/or if in the V-shaped regions between adjacent cylinders, in each case at least one camshaft is mounted for controlling the exhaust valves and the intake valves. This results in a compact W6 engine design, which requires little space.

The overall structure is simplified or the number of different components required is reduced if the two W3 engine units are constructed symmetrically relative to a plane located between the two W3 engine units and extending perpendicularly relative to the axis of the crankshaft.

The structure of the engine according to the invention can be designed differently. It can be provided that at least one fuel injection unit and/or at least one ignition unit is disposed in each cylinder head of the cylinder and/or that the cylinders of one W3 engine unit, looking in the direction of the crankshaft, are disposed laterally juxtaposed to the cylinders of the respective other engine unit and possibly in a common engine block. In principle, it is possible to feed in air or a fuel-air-mixture as fresh gas via the intake valves into the combustion chamber of the cylinder, so that a fuel injection unit can be omitted. The number of intake valves and exhaust valves is selectable. Two intake valves and one exhaust valve are usually provided. The valves can be designed to be suspended or standing.

The position of the camshaft is selectable. Provided that there is sufficient room in the spatial region between the cylinders of the respective W3 engine units for a camshaft and valves, e.g. at bank angles of 60°, for structural reasons the camshaft and the intake and exhaust valves are disposed in this region. It is, however, also quite possible, e.g. for bank angles of 40°, to dispose the camshaft and the valves in a region above the respective cylinders, i.e. in the cylinder head or cylinder head region.

A simple and compact design is supported if in particular the portion of the intake pipes and the exhaust pipes near the cylinders are formed in the cylinder block containing the two mutually juxtaposed cylinders that are parallel to the axis of rotation of the crankshaft and/or if the exhaust valves and/or the intake valves are disposed in the cylinder block or are at least partly accommodated by it. The combustion behavior is improved, if the direction of fuel injection and/or the direction of the air flowing in through the intake pipes run tangentially to or laterally onto the inner cylinder wall. The construction and assembly of the W6 engine are simple if the cylinders of one W3 engine unit are arranged together in a cylinder block with the respective cylinders of the other W3 engine unit, which are close to them, possibly with a common cylinder head.

The invention is explained below, for example using the drawings.

DESCRIPTION OF THE INVENTION

Figure 1:
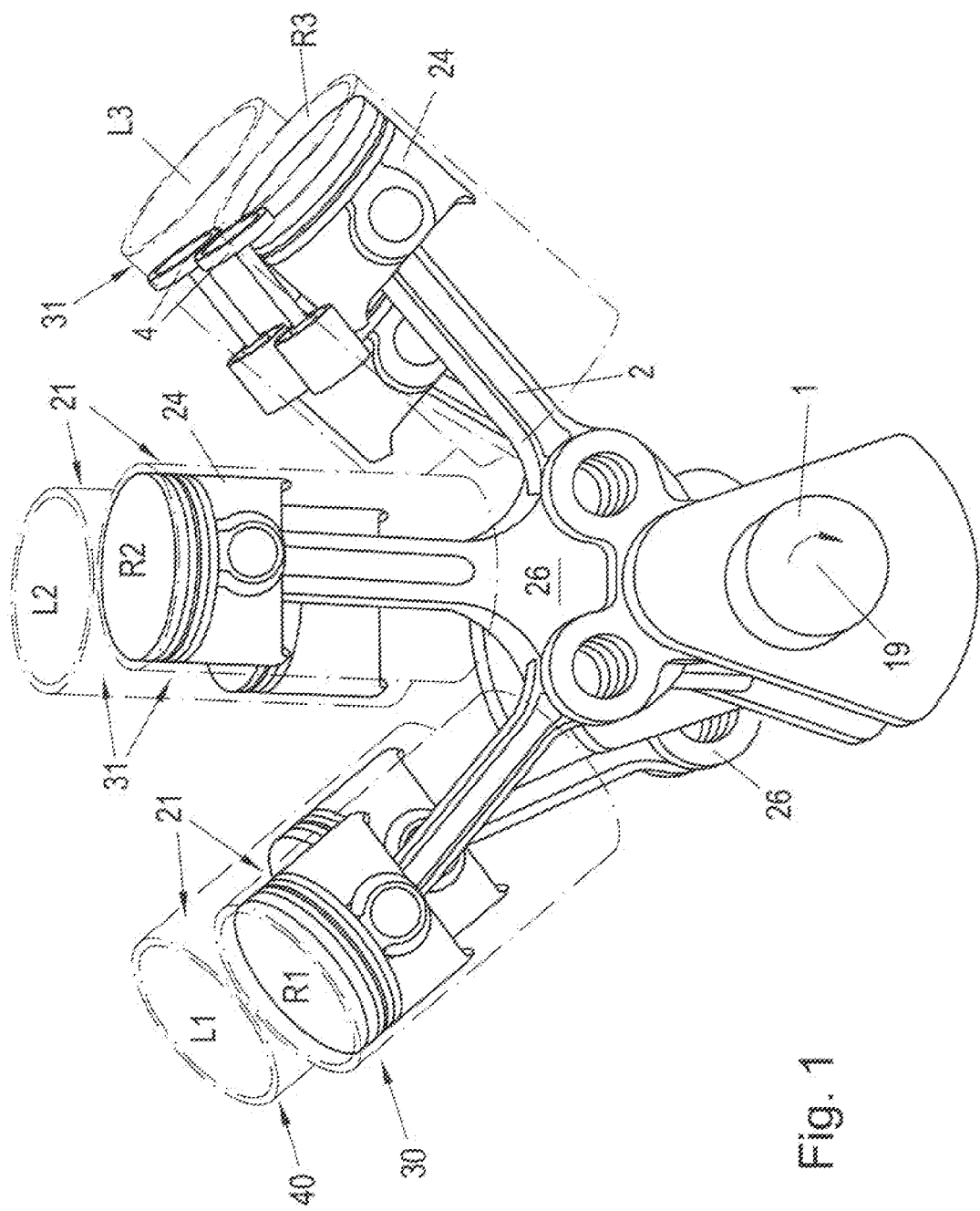
FIGS. 1 and 2 show basic views of a W6 engine, which is constructed with two W3 engine units.

FIG. 1 shows a W6 engine, which is formed with two juxtaposed W3 engine units 30, 40. Each W3 engine unit comprises three cylinders R1, R2 and R3 and L1, L2 and L3. The cylinders R1, R2 and R3 of the W3 engine unit 30 are constructed in the same way as the cylinders L1, L2 and L3 of the W3 engine unit 40. Pistons 24 are arranged in the individual cylinders, wherein the pistons 24 disposed in the outermost cylinder are connected via a connecting rod 2 to a linkage connecting rod 26, which is connected to the piston 24 of the central cylinder R2 or L2. The two articulated connecting rods 26 are connected to a crankshaft 1, which rotates about its axis 19 in the direction of the arrow.

Intake and exhaust valves are provided on the wall surfaces 21 or 31 or in the respective walls of the cylinders R1, R2, R3 or L1, L2, L3, and in fact said wall portions 21 and 31 each lie in opposite directions in relation to the direction of rotation of the crankshaft 1 or their central portion is essentially disposed in planes, that are perpendicular to the axis 19 of the crankshaft 1. In FIG. 1, only two intake valves 4 are indicated for the cylinder R3 of the W3 engine unit 30. The individual cylinders are illustrated without a cylinder head. The intake and exhaust pipes are likewise not illustrated for reasons of clarity. It can be seen, however, that both W3 engine units 30, 40 are constructed symmetrically relative to a plane, which is perpendicular to the axis 19 of the crankshaft. This symmetry applies to the whole W6 engine.

Figure 2:
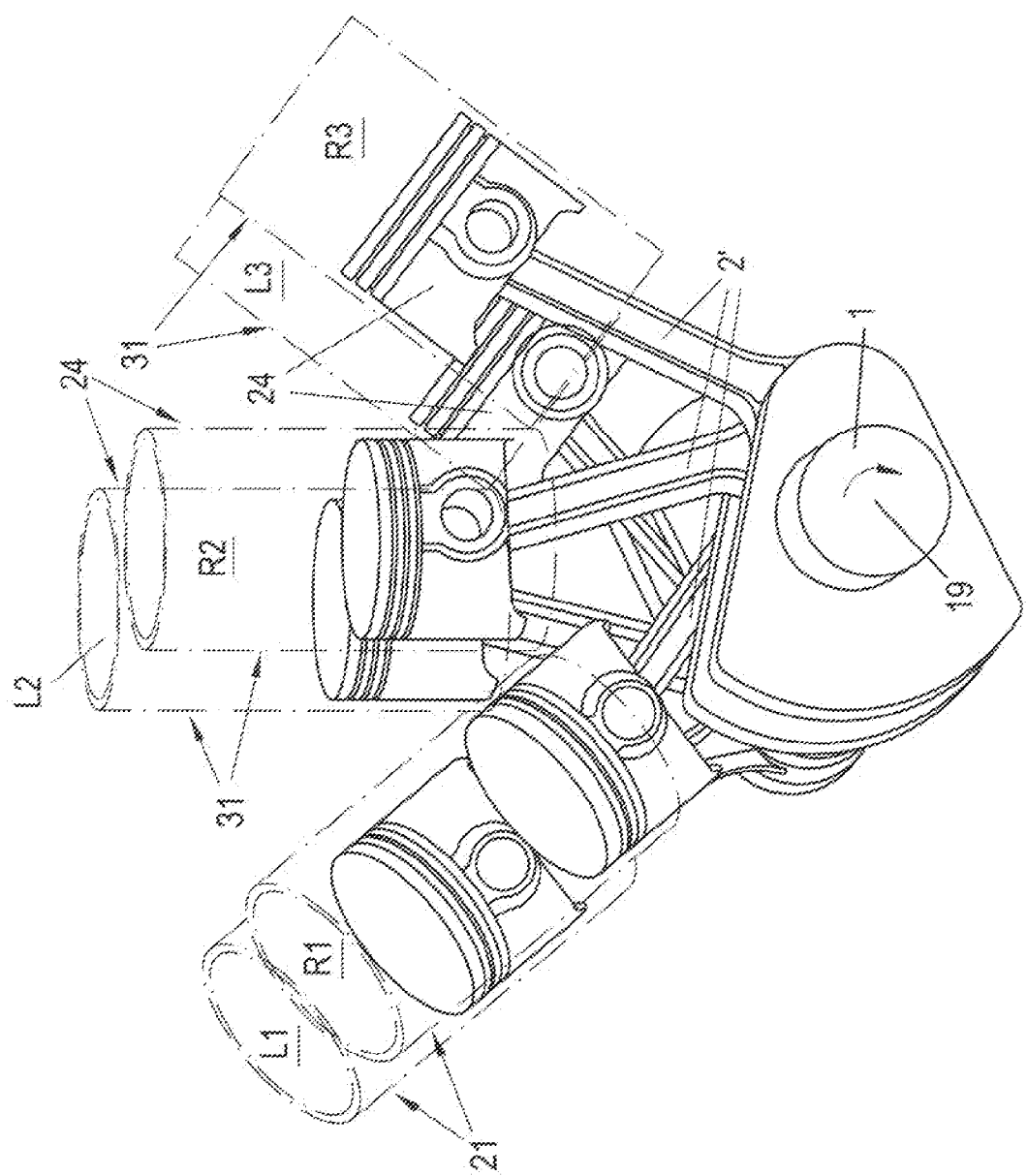

The direct connection of the pistons 24 of the individual cylinders R1, R2, R3; L1, L2, L3 via connecting rods 2' to the crankshaft 1 is illustrated in FIG. 2. The individual connecting rods 2' each lie on the respective crank pin of the crankshaft 1 offset by the width of the foot of the connecting rod. Accordingly, the cylinders are offset laterally. The exhaust pipe 20 comprises a pipe part 9 outgoing from the valve seat 8, which has a directional component, which is oriented towards the crankshaft 1 and/or transitions into a bend 10 connected to a pipe section 11 that is oriented towards the lateral surface 22 of the respective W3 engine unit 30, 40.

Figure 3:
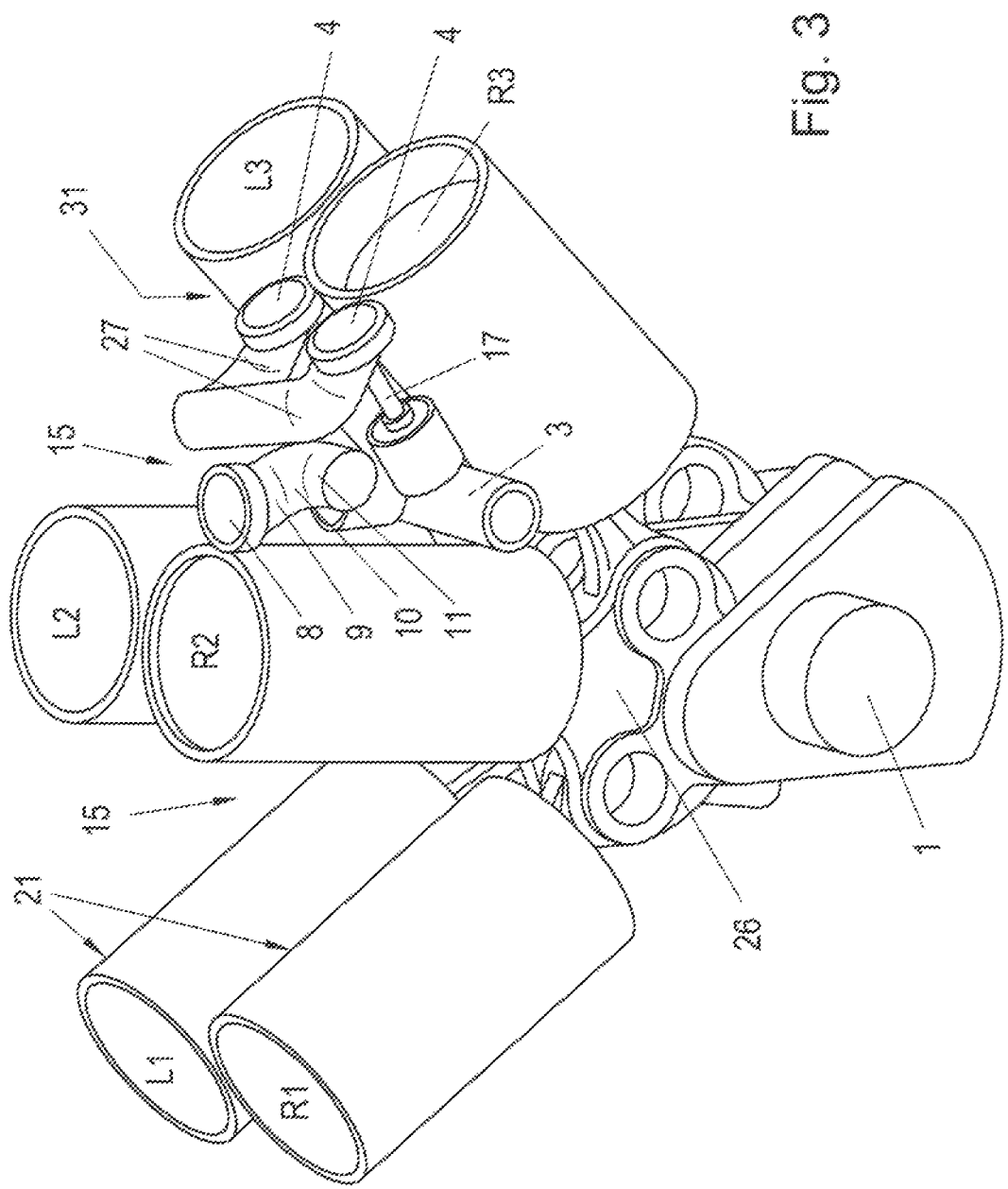
FIG. 3 shows a view of the basic structure of a W6 engine with schematically arranged intake and exhaust valves.

FIG. 3 shows an arrangement according to FIG. 1, wherein an exhaust valve 5 is disposed on the wall surface or in the wall 21 of the cylinder R2. Said exhaust valve 5 closes an exhaust pipe 20, which comprises a pipe part 9 outgoing from the valve seat 8 in the direction of the interior of the V-shaped space 15 between the cylinders, which transitions into a bend 10, which is extended by a pipe section 11. Said elements constitute the start of an exhaust pipe 20, which leads from the valve seat 8 of the exhaust valve 5 to the exhaust 18.

FIG. 3 further shows a camshaft 3, which is provided both for operating the intake valves 4 and also the exhaust valves 5. The valves 4, 5 are operated by tappets 17. Either air or a fuel-air-mixture flows into the combustion chamber of the respective cylinder via intake pipes 27 that can be closed by the intake valves 4.

Figure 4:
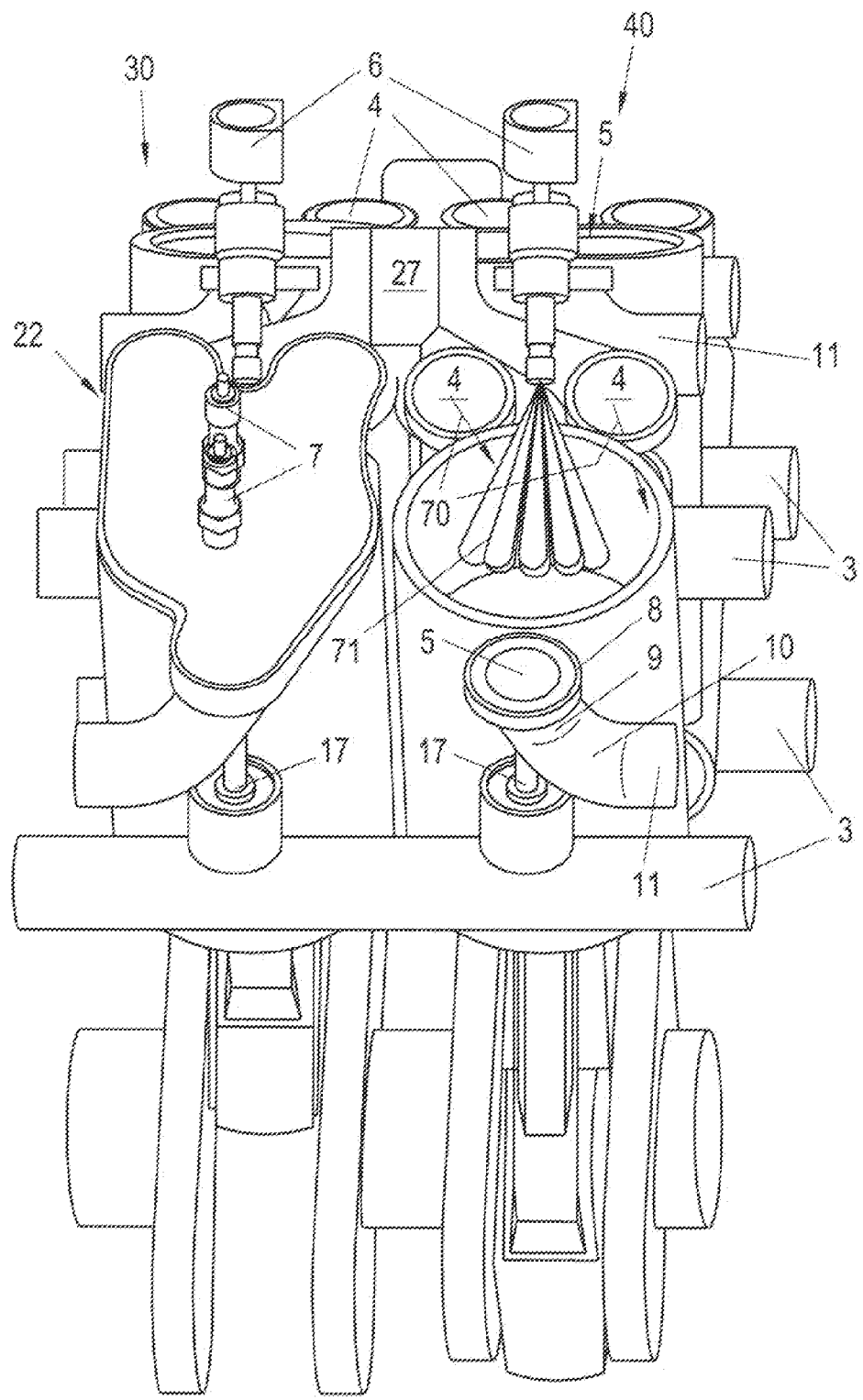
FIG. 4 shows a view of a W6 engine from one narrow side with exhaust pipes led out of the W6 engine.

FIG. 4 shows a frontal view of a W6 engine according to the invention. The two W3 engine units 30 and 40 are disposed with their broad sides juxtaposed and connected to the crankshaft 1 via linkage connecting rods 26.

Ignition units 7 or injection units 6, with which fuel can be injected into the combustion chamber or the respective cylinder, are disposed in the not illustrated or only schematically indicated cylinder heads of the individual cylinders.

The exhaust pipe 20 outgoing from the exhaust valves 5 is led out of the respective W3 engine units 30, 40 laterally in the region near the pipe section 11 or in the region near the lateral wall surface 22.

Fresh gas is fed into the combustion chambers of the individual cylinders through the intake pipe 27 via the intake valves 4. The exhaust pipes 20 are led out of the respective W3 engine units 30, 40 over the shortest possible distance.

Figure 5:
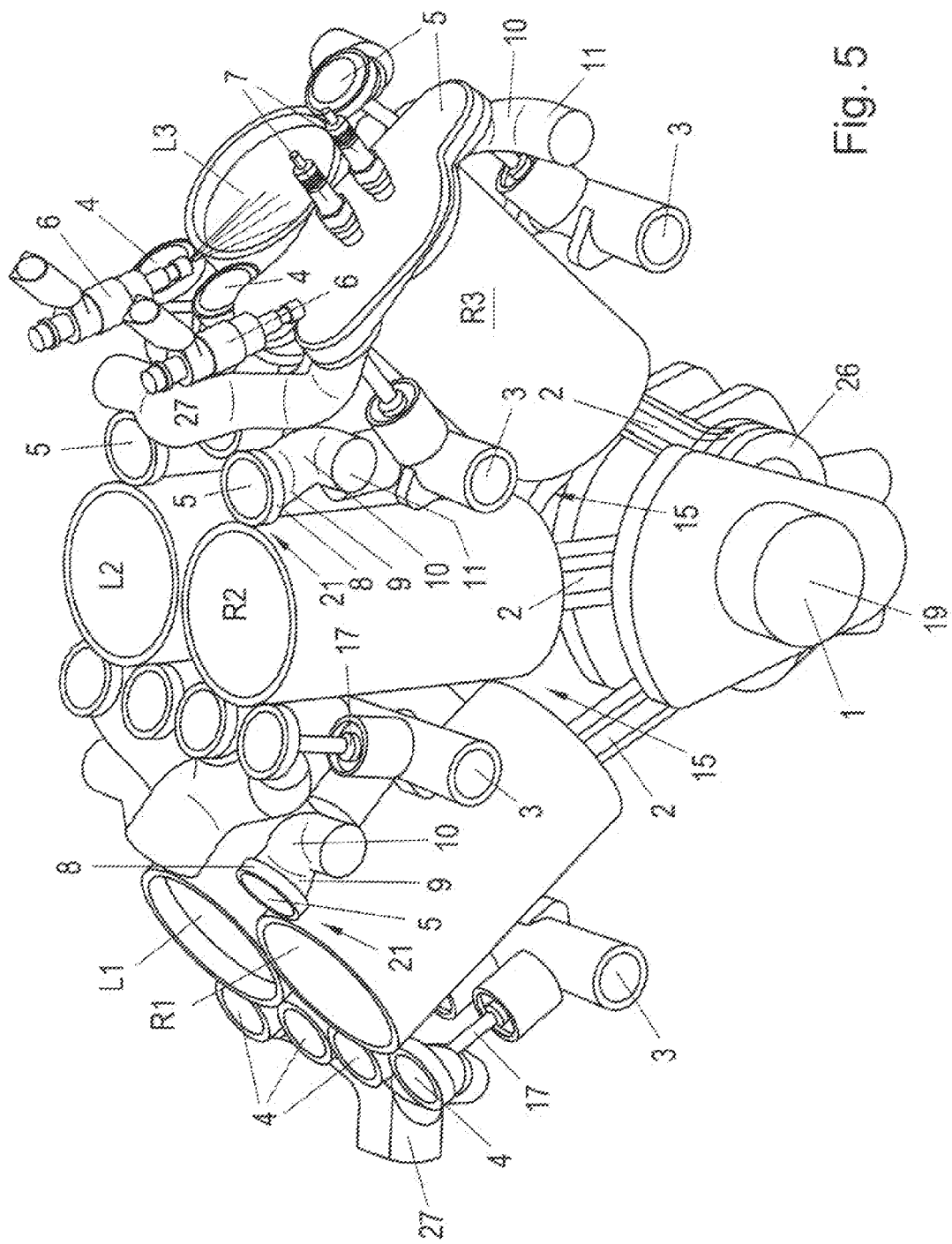
FIG. 5 shows a schematic view of a W6 engine.

FIG. 5 shows a schematic overall view of a W6 engine, wherein the exhaust valves 5 are disposed on the wall surfaces 21 of the respective cylinders and the respectively provided intake valves 4 are disposed on the opposing wall surfaces 31. A V-shaped space 15 is formed between the respective juxtaposed cylinders of each W3 engine unit 30, 40, and can be used advantageously so that the intake valves 4 and the exhaust valves 5 and also the camshaft 3, from which the valves 4, 5 are operated by tappets 17, are arranged in this space.

Figure 6:
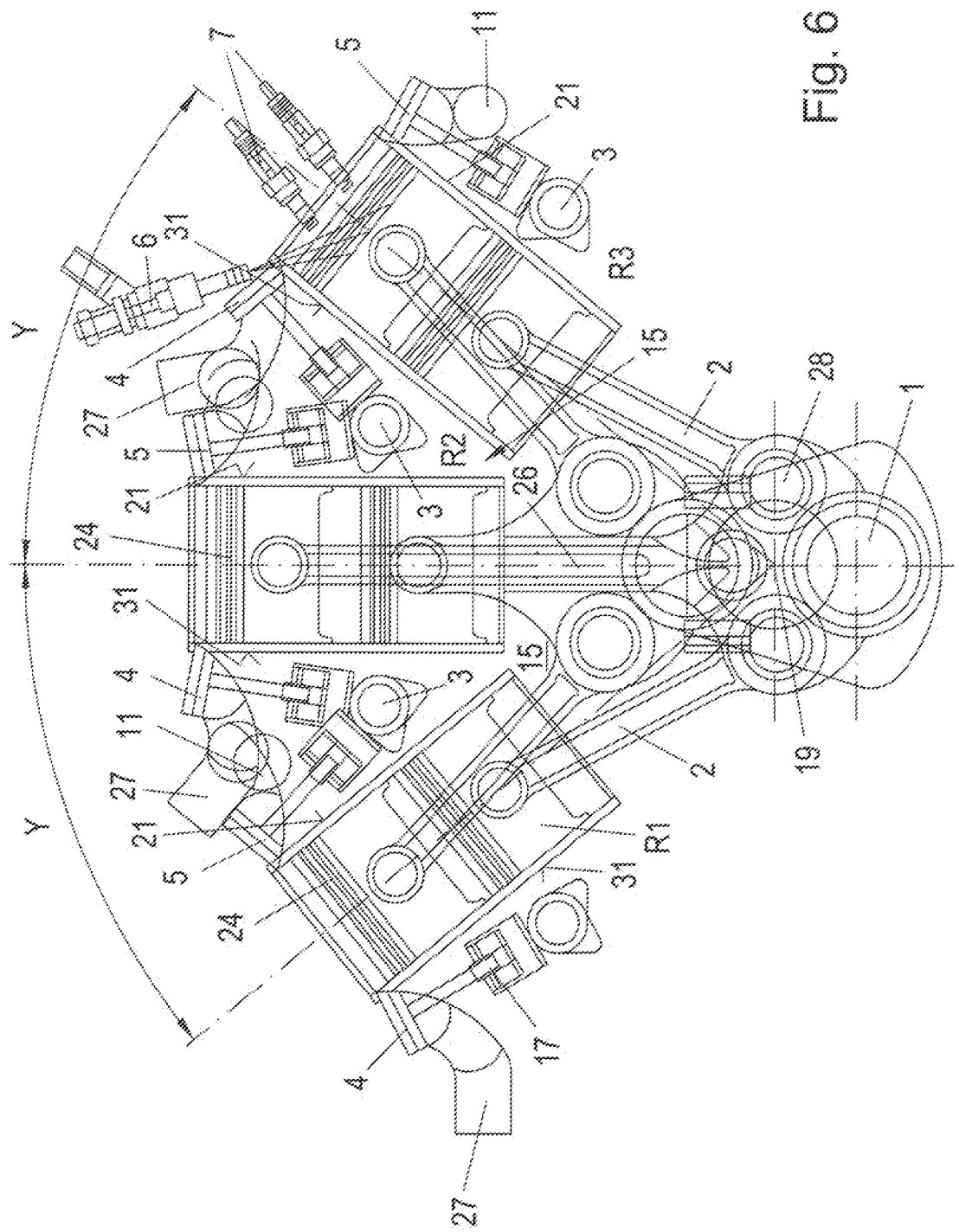
FIG. 6 shows a section through various embodiments of a W6 engine.

FIG. 6 shows a transparent section through a W6 unit. The individual connecting rods 2 are connected via wrist pins 28 to the main or linkage connecting rod 26. The pistons 24 of the one W3 engine unit are positioned at top dead center and the pistons 24 of the other W3 engine unit are positioned at bottom dead center; the illustration of the crankshaft 1 or the linkage connecting rod 26 being in accordance with this arrangement. The valve seat of the suspended valves 4, 5 is located very close to the combustion chamber or the piston track.

The intake valves 4 for the individual cylinders R1, R2, R3; L1, L2, L3 of the two W3 engine units 30, 40 lie in wall portions 31 of the respective cylinders that are oriented in the same direction of rotation of the crankshaft 1. Likewise, the wall portions 31 with the exhaust valves 5 for the individual cylinders R1, R2, R3; L1, L2, L3 of the two W3 engine units 30, 40 point in the same, but opposite direction to the orientation of the wall elements 31 in which the intake valves 4 are located.

Each exhaust valve 5 closes an exhaust pipe 20, which is led from the valve seat 8 of said exhaust valve 5 to the outer surface 22 of the W3 engine unit 30, 40 preferably extending perpendicularly to the crankshaft 1, in which the cylinder with this exhaust valve 5 is disposed.

It is further provided that a predetermined number of side-valve exhaust valves 5 and side-valve intake valves 4 are disposed in or on mutually opposing wall portions 21, 31 of the V-shaped space 15 bounded by juxtaposed cylinders R1, R2, R3; L1, L2, L3 in the respective W3 engine units 30, 40.

Figure 7:
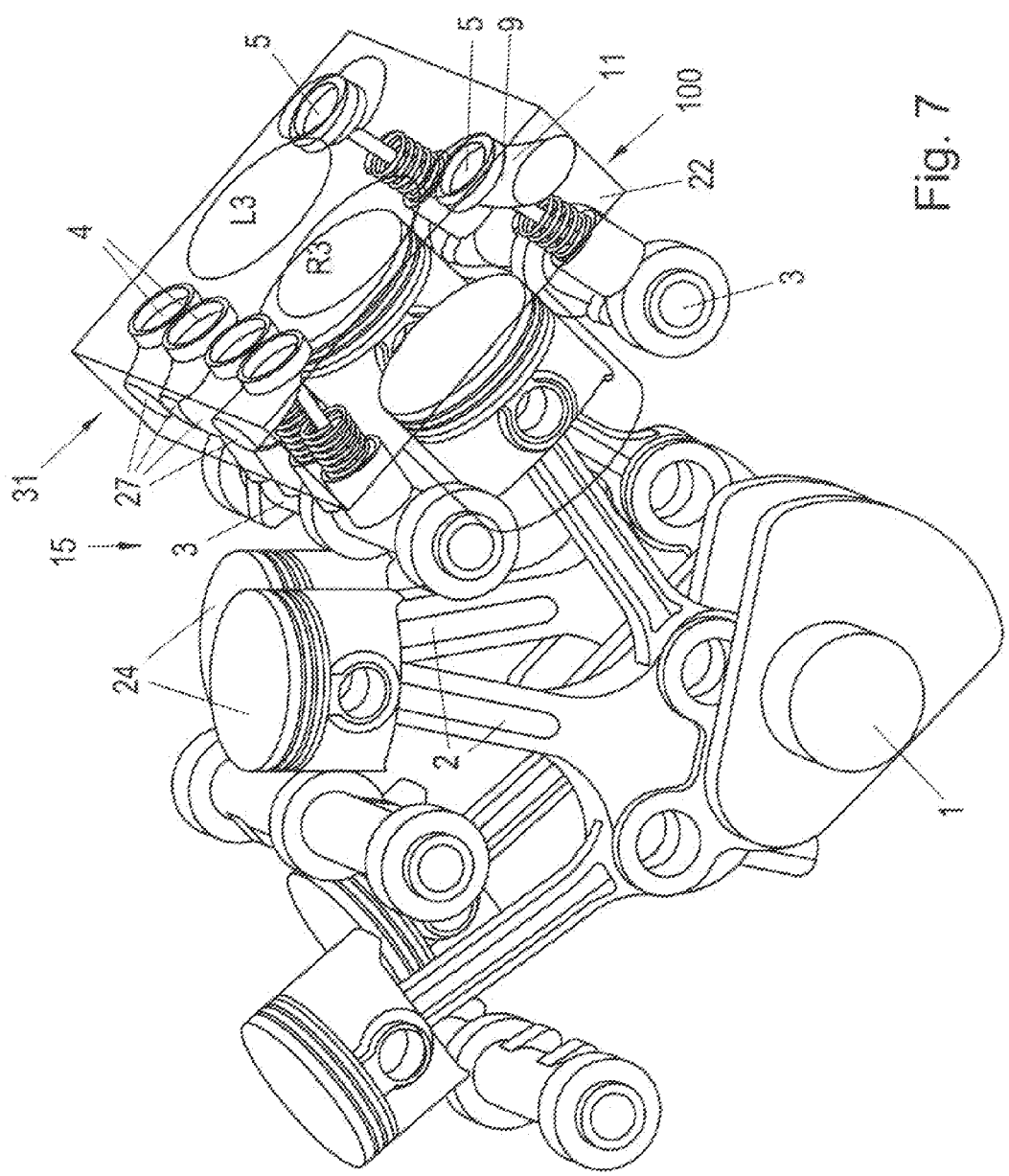
FIG. 7 shows schematically the structure of a cylinder block accommodating juxtaposed cylinders.

FIG. 7 shows a W6 engine similar to FIG. 3. The intake valves 4 and the exhaust valves 5 are disposed in the lateral portions of the cylinder block 100, wherein these wall portions 21, 31 are oriented oppositely in relation to the direction of rotation of the crankshaft 1. The cylinders and the intake valves 4, the exhaust valves 5, possibly the end portions of the intake pipe 27 close to the cylinder and/or the exhaust pipes 20 are accommodated by the cylinder block 100. Also with this embodiment of a W6 engine, the pipe sections 11 are led out through the respective lateral surfaces 22 of the respective W3 engine units 30, 40. The camshafts 3 are disposed between the juxtaposed cylinder blocks 100.

Figure 8:
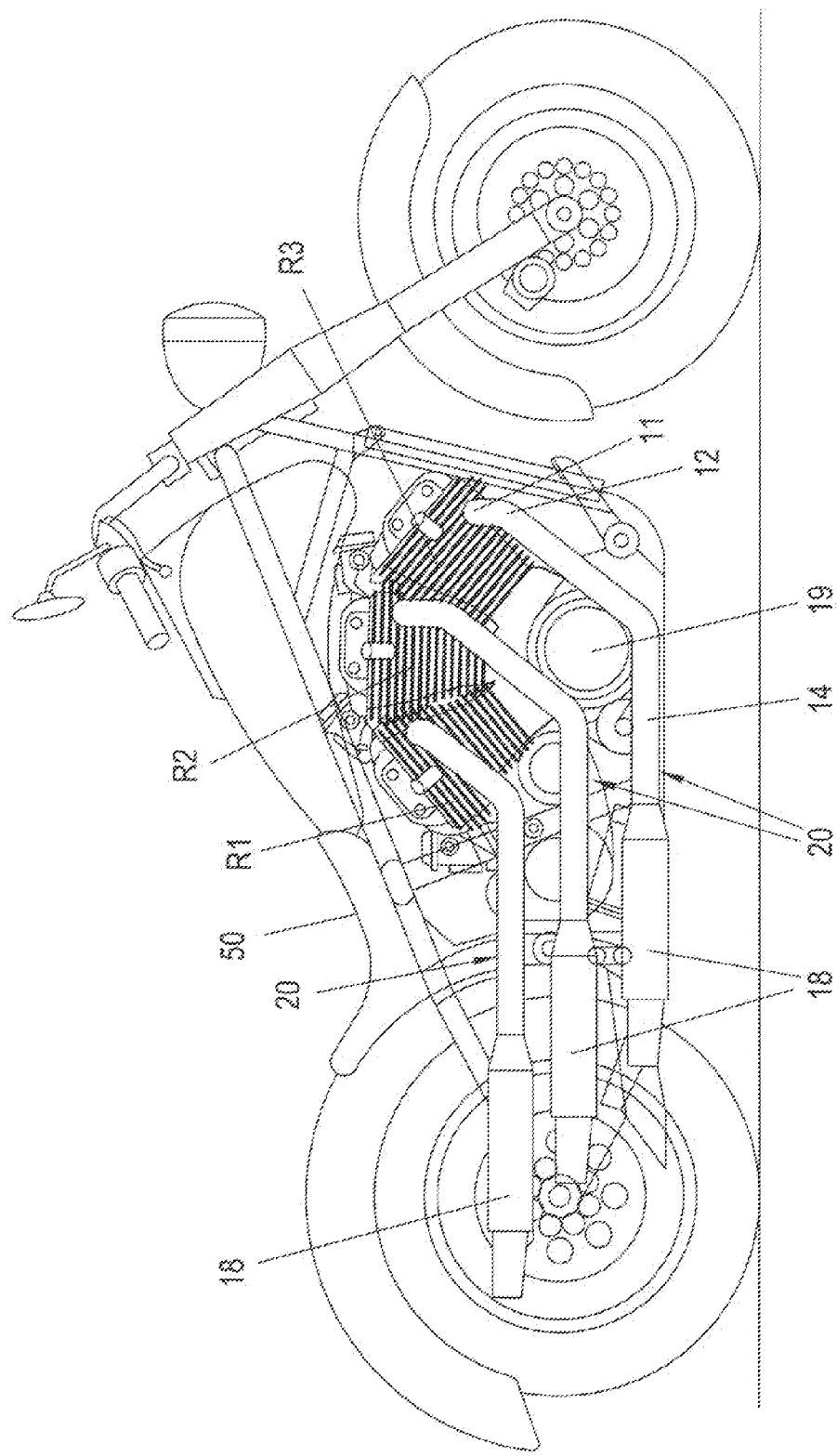
FIGS. 8 and 8a show views of a motor cycle fitted with a W6 engine according to the invention from both longitudinal sides.
Figure 8A:
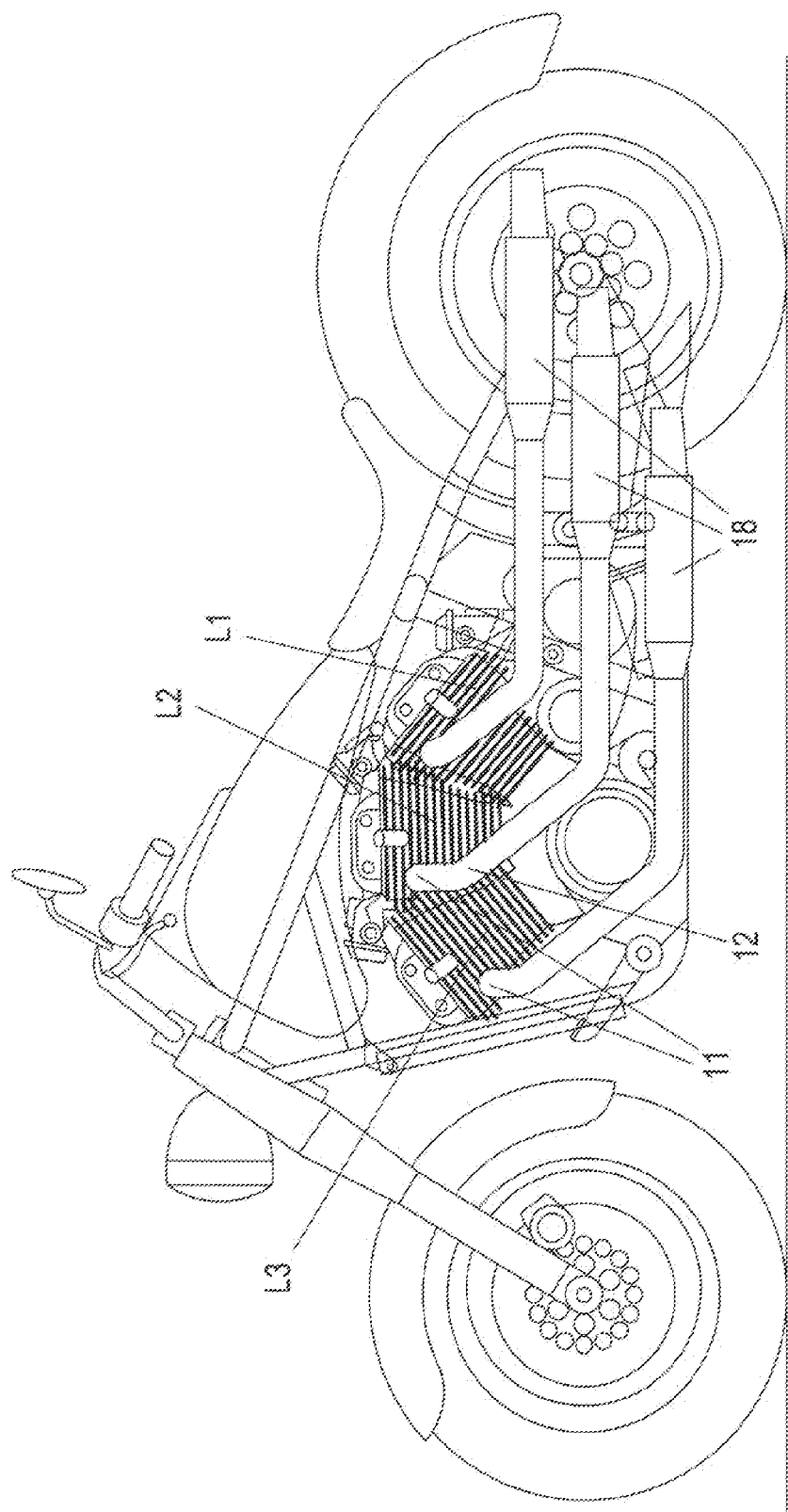

FIGS. 8 and 8*a* show a motor cycle from both sides. The pipe sections 11 outgoing from the lateral surfaces 22 of the respective W3 engine units 30, 40 or the cylinder blocks 100 are led to the exhaust 18 via an exhaust manifold 12 and if necessary further bends. From FIGS. 8 and 8*a* it can be seen that the wall surfaces 31 provided with the exhaust valves 5 point in the direction of travel of the vehicle.

The W6 engine is installed in the motor cycle transversely, i.e. the axis 19 of the crankshaft 1 is perpendicular to a vertical longitudinal central plane of the vehicle, which longitudinal central plane can also be the plane of symmetry of the W6 engine.

It is advantageous for the practical vibration-free operation of a W6 engine if, with a bank angle of 60° for the cylinders of the two W3 engine units 30, 40, the crank offset between the W3 engine units 30, 40 is set to 270° with the ignition sequence L2 270°, R2 150°, L3 150°, R1 90°, L1 30°, R3 30°, L2 . . . or if for a 4-stroke engine with bank angles of 60° and 60° and a crankshaft pin offset of 180° for the cylinders R1, R2, R3; L1, L2, L3 of the juxtaposed W3 engine units 30, 40 an ignition sequence of L2 120°, R1 120°, R3 60°, L1 120°, L3 120°, R2 180°, L2 . . . is set, or if with bank angles of 40° and 40° for a crankshaft pin offset of 180° between the juxtaposed W3 engine units 30, 40 for the cylinders R1, R2, R3; L1, L2, L3, an ignition sequence of L2 140°, R1 80°, R3 100°, L1 80°, L3 140°, R2 180°, L2 . . . is set.

It is clear that the respective outer valves 4, 5 or exhaust and intake pipes 20, 27 on the outer cylinder blocks 100 have no opposing equivalent.

The integration of two laterally juxtaposed cylinders in a cylinder block 100 improved the compactness and the ability of the engine to be cooled.

In FIG. 4 the tangential inflows of the air are denoted by the arrows 70 and the fuel jets are denoted by 71.

The invention claimed is:

1. A W6 engine, comprising:
two W3 engine units disposed juxtaposed on a common crankshaft, said engine units having juxtaposed cylinders with pistons driving the common crankshaft;
wherein said juxtaposed cylinders in said W3 engine units have axes enclosing a common bank angle of 30 to 70°;
each said cylinder having at least two intake valves and at least one exhaust valve, and exhaust pipes of said cylinders leading to an exhaust;
said intake valves for the individual said cylinders of said two W3 engine units being disposed in wall portions of the respective said cylinders that are oriented in the same circumferential direction about the crankshaft or in lateral portions of their cylinder block;
said at least one exhaust valve for the individual said cylinders of said two W3 engine units being disposed in wall portions of the respective said cylinders or cylinder blocks that are oriented in the same, but opposite, circumferential direction about the crankshaft as the wall portions in which said intake valves are disposed;
wherein a predetermined number of side-valve exhaust valves and side-valve intake valves are disposed in or on mutually opposed wall portions of a V-shaped space bounded by said juxtaposed cylinders in the respective said W3 engine units; and
each said exhaust valve closing each of said exhaust pipes, leading from a valve seat of each said exhaust valve to a lateral or outer surface of the respective said W3 engine unit in which said cylinder with said exhaust valve is disposed and which faces away from the respective other said W3 engine unit.

2. The W6 engine according to claim 1, wherein said juxtaposed cylinders in said W3 engine units enclose a common bank angle of 38° to 60°, and wherein each of said exhaust pipes leading from each said valve seat of said exhaust valve leads to a lateral or outer surface extending perpendicularly relative to the crankshaft.

3. The W6 engine according to claim 1, wherein each of said exhaust pipes includes a pipe portion outgoing from the respective valve seat which comprises a directional component that points towards the crankshaft and/or transitions into a bend connected to a pipe section directed towards a lateral surface of the respective said W3 engine unit.

4. The W6 engine according to claim 3, wherein each of the pipe sections in proximity to the lateral surface of the respective said W3 engine unit, disposed outside the W3 engine unit or outside an outer surface of the W3 engine unit, comprises an exhaust manifold connected to a pipe leading to the exhaust.

5. The W6 engine according to claim 1, wherein the axes of the cylinders of the two W3 engine units extend in or are parallel to a plane that extends perpendicularly relative to an axis of said crankshaft.

6. The W6 engine according to claim 1, wherein portions of intake pipes and the exhaust pipes close to the cylinder are formed in the cylinder block accommodating the two juxtaposed cylinders that are parallel to an axis of rotation of the crankshaft.

7. The W6 engine according to claim 1, wherein at least one camshaft for controlling the exhaust valves and the intake valves is mounted in V-shaped regions between juxtaposed cylinders in each case.

8. The W6 engine according to claim 1, wherein the two W3 engine units are constructed symmetrically relative to a plane arranged between the two W3 engine units and extending perpendicularly relative to an axis of the crankshaft.

9. The W6 engine according to claim 1, wherein at least one fuel injection unit and/or at least one ignition unit is disposed in each cylinder head of the cylinders.

10. The W6 engine according to claim 1, wherein the cylinders of one W3 engine unit, looking in a direction of the crankshaft, are disposed laterally adjacent to the cylinders of the respective other engine unit and constructed or disposed in a common cylinder block.

11. The W6 engine according to claim 1, wherein at a bank angle of 60° for the cylinders of the two W3 engine units, a crankshaft offset between the W3 engine units is 270° and an ignition sequence is set to L2 270°, R2 150°, L3 150°, R1 90°, L1 30°, R3 30°, L2.

12. The W6 engine according to claim 1, wherein an ignition sequence of L2 120°, R1 120°, R3 60°, L1 120°, L3 120°, R2 180°, L2 . . . is set for the cylinders of the juxtaposed W3 engine units of a 4-stroke engine with bank angles of 60° and 60° and a crank pin offset of 180°.

13. The W6 engine according to claim 1, wherein an ignition sequence of L2 140°, R1 80°, R3 100°, L1 80°, L3 140°, R2 180°, L2 . . . is set at bank angles of 40° and 40° for the cylinders for a crank pin offset of 180° between juxtaposed W3 engine units.

14. The W6 engine according to claim 1, wherein the pistons of the cylinders are connected to the crankshaft either via a main connecting rod with two linkage connecting rods, wherein the cylinder axes of the cylinders of the respective W3 engine units extend in a plane, which is perpendicular to the crankshaft or that a side-by-side mounting of the three connecting rods of the pistons of the individual cylinders on the crankshaft is provided, wherein the cylinder offset in a direction parallel to the crankshaft is a width of one connecting rod foot and the axes of the cylinders extend at different distances parallel to a plane, which extends perpendicularly relative to the axis of the crankshaft.

15. The W6 engine according to claim 1, wherein said cylinders of one of said W3 engine units are disposed together with the respective juxtaposed cylinders of the respective other said W3 engine unit in the cylinder block, optionally with a common cylinder head.

16. The W6 engine according to claim 1, wherein a direction of the fuel injection and/or the direction of air flowing in through intake pipes runs tangentially relative to or laterally onto an inner cylinder wall.

17. The W6 engine according to claim 1, wherein the exhaust valves and/or the intake valves are disposed in the cylinder block or are at least partially accommodated by said cylinder block.

18. A motor vehicle, comprising a W6 engine according to claim 1.

19. The motor vehicle according to claim 18, wherein said W6 engine is installed in the vehicle transversely or with its crankshaft perpendicular to a vertical central longitudinal plane in the vehicle.

20. The motor vehicle according to claim 18, wherein wall surfaces provided with the exhaust valves point in a direction of travel of the vehicle.

\* \* \* \* \*